(12) United States Patent
Hall

(10) Patent No.: US 6,929,112 B2
(45) Date of Patent: Aug. 16, 2005

(54) CONVEYOR BELT CLEANING SYSTEM

(76) Inventor: John Hall, 8 Olympia Fields, Winfield, WV (US) 25213

( * ) Notice: Subject to any disclaimer, the term of this patent is extended or adjusted under 35 U.S.C. 154(b) by 184 days.

(21) Appl. No.: 10/081,389

(22) Filed: Feb. 22, 2002

(65) Prior Publication Data

US 2002/0125106 A1 Sep. 12, 2002

Related U.S. Application Data

(60) Provisional application No. 60/270,825, filed on Feb. 22, 2001.

(51) Int. Cl.$^7$ .............................................. B65G 45/00
(52) U.S. Cl. ........................ 198/499; 198/495; 198/497
(58) Field of Search ................................ 198/499, 495, 198/497, 498

(56) References Cited

U.S. PATENT DOCUMENTS

| | | | | |
|---|---|---|---|---|
| 3,952,863 A | * | 4/1976 | Schattauer ................... | 198/230 |
| 4,105,109 A | * | 8/1978 | Schultz ........................ | 198/499 |
| 4,768,644 A | * | 9/1988 | Cromm ....................... | 198/499 |
| 4,838,409 A | * | 6/1989 | Rappen ....................... | 198/497 |
| 5,222,589 A | * | 6/1993 | Gordon ....................... | 198/497 |
| 5,746,302 A | * | 5/1998 | Bowman ..................... | 198/496 |
| 5,950,803 A | * | 9/1999 | Schwarze .................... | 198/499 |
| 5,975,281 A | * | 11/1999 | Yoshizako et al. .......... | 198/499 |
| 6,076,656 A | * | 6/2000 | Mat ............................ | 198/499 |
| 6,095,318 A | * | 8/2000 | Brink .......................... | 198/499 |
| 6,152,290 A | * | 11/2000 | Mott et al. .................. | 198/499 |
| 6,179,114 B1 | * | 1/2001 | Brink .......................... | 198/499 |
| 6,182,816 B1 | * | 2/2001 | Gibbs et al. ................. | 198/497 |
| 6,296,105 B1 | * | 10/2001 | Carnes ........................ | 198/499 |
| 6,360,875 B1 | * | 3/2002 | Altemus, Jr. et al. ....... | 198/499 |
| 6,374,991 B1 | * | 4/2002 | Swinderman ............... | 198/499 |
| 6,401,911 B1 | * | 6/2002 | Swinderman ............... | 198/499 |
| 6,439,373 B1 | * | 8/2002 | Swinderman ............... | 198/499 |
| 6,575,292 B2 | * | 6/2003 | Swinderman ............... | 198/499 |
| 6,581,754 B2 | * | 6/2003 | Law ............................ | 198/499 |
| 6,619,469 B2 | * | 9/2003 | Malmberg ................... | 198/497 |

OTHER PUBLICATIONS

BMS Manufacturing & Sales, Product brochure for Pro-–Tector Belt Cleaning System 2000.
Brelko International product brochure for Conveyor Belt Scraper.

* cited by examiner

Primary Examiner—Eileen D. Lillis
Assistant Examiner—Rashmi Sharma
(74) Attorney, Agent, or Firm—Steptoe & Johnson PLLC

(57) ABSTRACT

A conveyor belt cleaning system being a torsion blade holder assembly having a mounting sub-assembly and a blade support sub-assembly. The mounting sub-assembly has a first hollow member and a second member situated at least partially therein with torsion elements in the plurality of spaces or cavities between the first hollow member and the second member. The blade support sub-assembly, in which a scraper blade is secured, is attached to the second member such that when the scraper blade meets resistance while scraping the surface of a conveyor belt, the torsion elements are compressed and the blade support sub-assembly with the scraper blade rotates away from the conveyor belt. The blade support sub-assembly includes notched receiving members for receiving the scraper blade, a face plate extending between the notched receiving members approximately parallel to the scraper blade such that at least a portion of the scraper blade rests flush against the face plate when the scraper blade is situated in the notched receiving members, a horizontal blade stabilizer approximately perpendicular to and extending beneath the face plate, and a means for vertically adjusting the scraper blade within the notched receiving members. The means for vertically adjusting is one or more adjustable lock bolts extending upward through the horizontal blade stabilizer for adjusting the scraper blade up and down within the notched receiving members. The torsion blade holder assembly optionally includes a shield and a means for spraying a liquid on the conveyor belt.

38 Claims, 6 Drawing Sheets

CONVEYOR BELT CLEANING SYSTEM

CROSS-REFERENCE TO RELATED APPLICATIONS

This application claims the benefit of U.S. application Ser. No. 60/270,825, filed Feb. 22, 2001.

BACKGROUND OF THE INVENTION

1. Field of the Invention

This invention relates to conveyor belts, and, more particularly, to scraper blades for cleaning conveyor belts.

2. Related Art

Conveyor belts are often used to convey materials that adhere to the surface of the belt. In order to maintain efficient operation of the conveyor belt system, the excess debris must be removed from the surface of the belt. Accordingly, there are various types of scraper blade assemblies that are used to scrap the debris from a surface of a conveyor belt.

A common type of scraper blade assembly comprises a plurality of mounted scraper blades extending across the transverse axis of the conveyor belt. The blade assemblies are mounted on support arms which are fixed to and extend from a transverse rotatable support shaft. Rotation of the transverse support shaft moves the scraper blades into and out of contact with the conveyor belt. Applying a torque to the support shaft increases the contacting force of the scraper blades against the belt.

During installation and use of the standard scraper blade assemblies, the support shaft is torqued and locked in position when a predetermined contacting force is exerted on the belt by the scraper blade assemblies. As the scraper blades wear down, the contacting force on the belt steadily decreases, thereby reducing the cleaning efficiency of the scraper blade assembly. Over the useful life of the scraper blades, the support shaft must be adjusted several times to compensate for wear on the blades. After prolonged use, standard clamps and set screws become ineffective to maintain and adjust the contacting force. A further problem with this method is that it is not possible to adjust a single scraper blade, i.e., an adjustment to one is an adjustment to all because it is the shaft on which the scraper blades are mounted that is adjusted. A still further problem is that the scraper blades undergo significant stress from vibrations resulting from the fact that the blades are only bolted or screwed directly on to the face of the assembly.

Therefore, there is a need for a conveyor belt scraper blade assembly having a blade that is vertically adjustable within the assembly such that the blade is vertically adjustable in relation to the conveyor belt and the housing for the blade. There is further a need for a means for easily and efficiently removing a blade from the scraper blade assembly so that a worn blade can be replaced with a new blade In addition to the above, conventional blade assemblies do not provide any means for loosening or diluting debris on a conveyor belt prior to scraping the conveyor belt with a blade assembly. Therefore, there is a need for a conveyor belt scraper blade assembly that loosens and dilutes the debris, such as by spraying water on the surface of the conveyor belt, prior to scraping the conveyor belt surface with a blade assembly.

SUMMARY OF THE INVENTION

The present invention solves the foregoing problems by introducing a heavy-duty torsion blade holder assembly that secures the scraper blade more securely than conventional methods, and in which it is possible to adjust the height of the blade independent of the shaft on which it is mounted.

One aspect of the invention is a blade support member, including notched receiving members for receiving a scraper blade and adapted for use with a first hollow member of a torsion blade holder assembly; a face plate extending between the notched receiving members and about parallel to the scraper blade such that at least a portion of the scraper blade rests flush against the face plate when the scraper blade is situated in the notched receiving members; a horizontal blade stabilizer about perpendicular to and extending beneath the face plate, and adjustable lock bolts extending upward through the horizontal blade stabilizer for adjusting the scraper blade up and down within the notched receiving members.

Another aspect of the invention is a torsion blade holder assembly, including a first hollow member having an inside diameter; a second member having an outside diameter less than the inside diameter of the first hollow member and wherein at least a portion of the second hollow member is situated within the first hollow member such that a volume of space separates the first hollow member from the second hollow member; torsion elements situated in the plurality of spaces between the first hollow member and the second member thereby resiliently restricting rotation of the second member within the first hollow member; and a blade support member including notched receiving members for receiving a scraper blade and adapted for use with a first hollow member of a torsion blade holder assembly; a face plate extending between the notched receiving members and about parallel to the scraper blade such that at least a portion of the scraper blade rests flush against the face plate when the scraper blade is situated in the notched receiving members; a horizontal blade stabilizer about perpendicular to and extending beneath the face plate, and adjustable lock bolts extending upward through the horizontal blade stabilizer and in communication with the bottom of the scraper blade for adjusting the scraper blade up and down within the notched receiving members.

Another aspect of the invention is a torsion blade holder assembly, including a first hollow member having an inside diameter; a second member having an outside diameter less than the inside diameter of the first hollow member and wherein at least a portion of the second hollow member is situated within the first hollow member such that a volume of space separates the first hollow member from the second hollow member; torsion elements situated in the plurality of spaces between the first hollow member and the second member thereby resiliently restricting rotation of the second member within the first hollow member; a blade support member including notched receiving members for receiving a scraper blade and adapted for use with a first hollow member of a torsion blade holder assembly; a face plate extending between the notched receiving members and about parallel to the scraper blade such that at least a portion of the scraper blade rests flush against the face plate when the scraper blade is situated in the notched receiving members; a horizontal blade stabilizer about perpendicular to and extending beneath the face plate; and adjustable lock bolts extending upward through the horizontal blade stabilizer and in communication with the bottom of the scraper blade for adjusting the scraper blade up and down within the notched receiving members; and a liquid source and one or more nozzles extending along a shaft upon which the torsion blade holder assembly is mounted, wherein the liquid source and nozzle(s) are mounted on the outer surface of the shaft and extend upward through one or more holes in a shield mounted on the scraper blade such that one nozzle protrudes through one hole in the shield. The shield may be mounted on the scraper blade such that it extends over and covers either the front or the back of the torsion blade holder assembly. In operation, when the shield and nozzle(s) are mounted on the front of a scraper blade, a liquid is sprayed at a point on a conveyor belt ahead of the torsion blade holder assembly as a means for loosening or diluting the debris on the conveyor belt prior to scraping, thereby facilitating the cleaning process of the conveyor belt. When the shield and nozzle(s) are mounted on the back of a scraper blade, a liquid is sprayed at a point on a conveyor belt behind the torsion blade holder assembly as a means for conditioning or treating the conveyor belt after it has been cleaned, such as treating the cleaned conveyor belt with anti-freeze or a dust prohibitor.

A feature of the invention is that the second member has rounded corners thereby increasing the range of rotation within the first hollow member. As a result, the scraper blade is able to deflect away from the conveyor belt at a greater angle when the scraper blade comes into contact with debris on the surface of the belt.

Another feature of the invention is vertical blade stabilizers on the notched receiving members for anchoring the scraper blade securely in place.

Another feature of the invention is a horizontal blade stabilizer perpendicular to and extending beneath the face plate.

Another feature of the invention is adjustable lock bolts for adjusting the height of the scraper blade independent of the shaft on which the torsion blade holder assemblies are mounted.

Another feature of the invention is a shielded tungsten carbide tip scraper blade.

Another feature of the invention is that the scraper blade is positioned directly above the center of the carrier shaft thereby creating a more positive cleaning pressure and improving the cleaning capabilities of the torsion blade holder assembly.

Another feature of the invention is that the torsion blade holder assembly can be adapted to accept a means for spraying a liquid, e.g., water, anti-freeze, or dust prohibitor, onto the belt, thereby diluting the material and debris on the belt before the blade comes into contact with the surface of the belt or treating the surface of the conveyor belt after it has been cleaned.

An advantage of the invention is that the vertical blade stabilizers provide an added measure of support for the scraper blade in addition to traditional mounting bolts that secure the scraper blade to the face plate.

Another advantage of the invention is that decrease in the vibration of the scraper blade increases the useful life of the scraper blade and torsion blade holder assembly, and also improves their cleaning abilities.

Another advantage of the invention is that, due to the increased range of rotation of the scraper blade, larger obstructions adhered to the conveyor belt are able to pass the torsion blade holder assembly thereby increasing the useful life of the scraper blade as well as the and torsion blade holder assembly.

EMBODIMENTS OF THE INVENTION

Figure 4A:
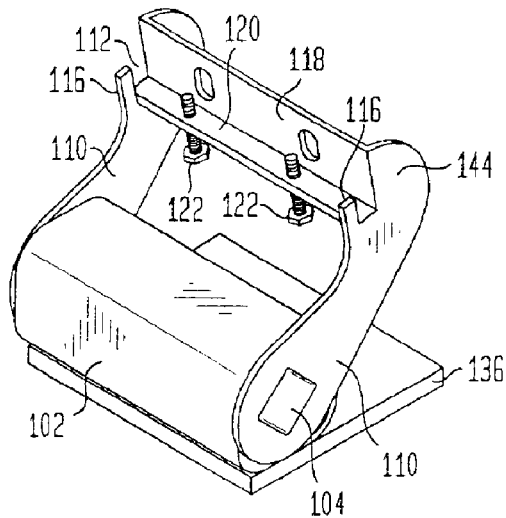
FIG. 4A is a perspective view of a torsion blade holder assembly without a scraper blade.
Figure 4B:
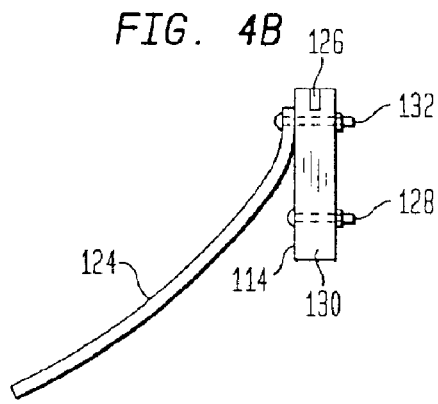
FIG. 4B is a planar side view of a shield and scraper blade.
Figure 5A:
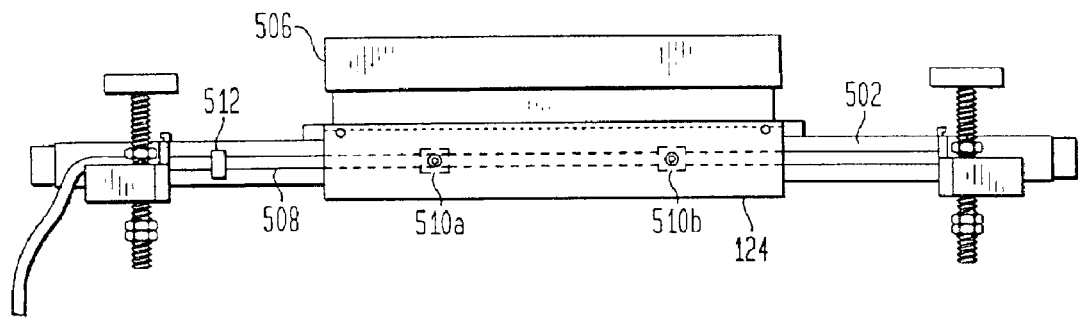
FIG. 5A is a front view of a conventional blade assembly mounted on a shaft and adapted for use with a source of liquid and a plurality of nozzles.
Figure 5B:
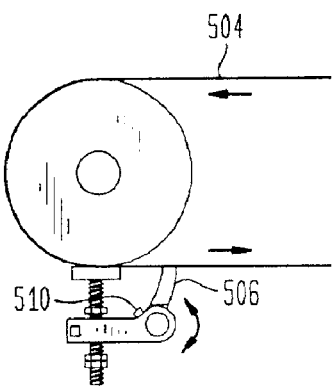
FIG. 5B is a planar side view of a scraper blade engaging the surface of a conveyor belt during cleaning.
Figure 5C:
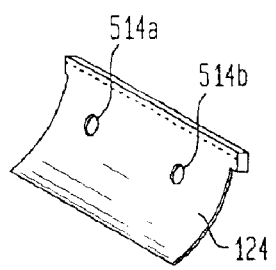
FIG. 5C is a perspective view of a shield.
Figure 5D:
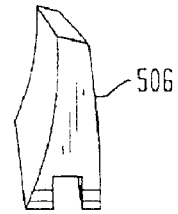
FIG. 5D is a perspective view of a scraper blade.
Figure 6:
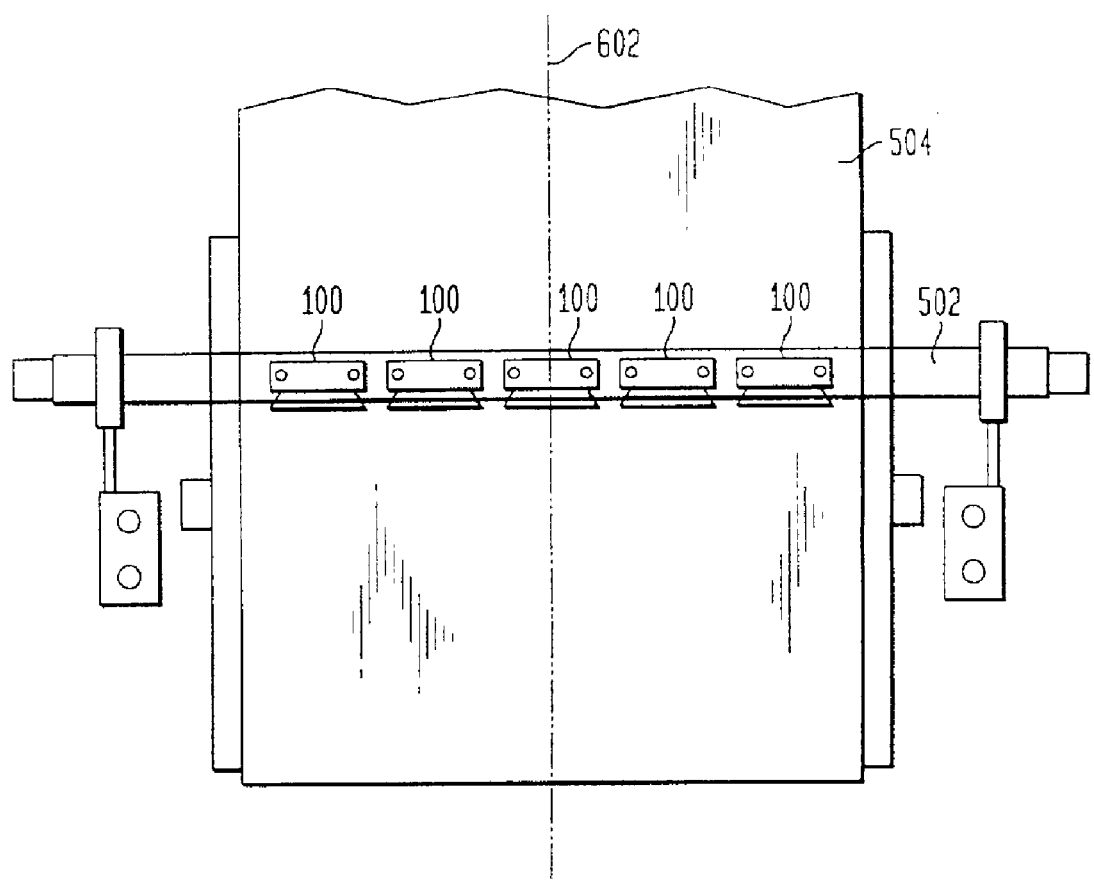
FIG. 6 is a planar top view of multiple torsion blade holder assemblies mounted on a shaft.
Figure 7:
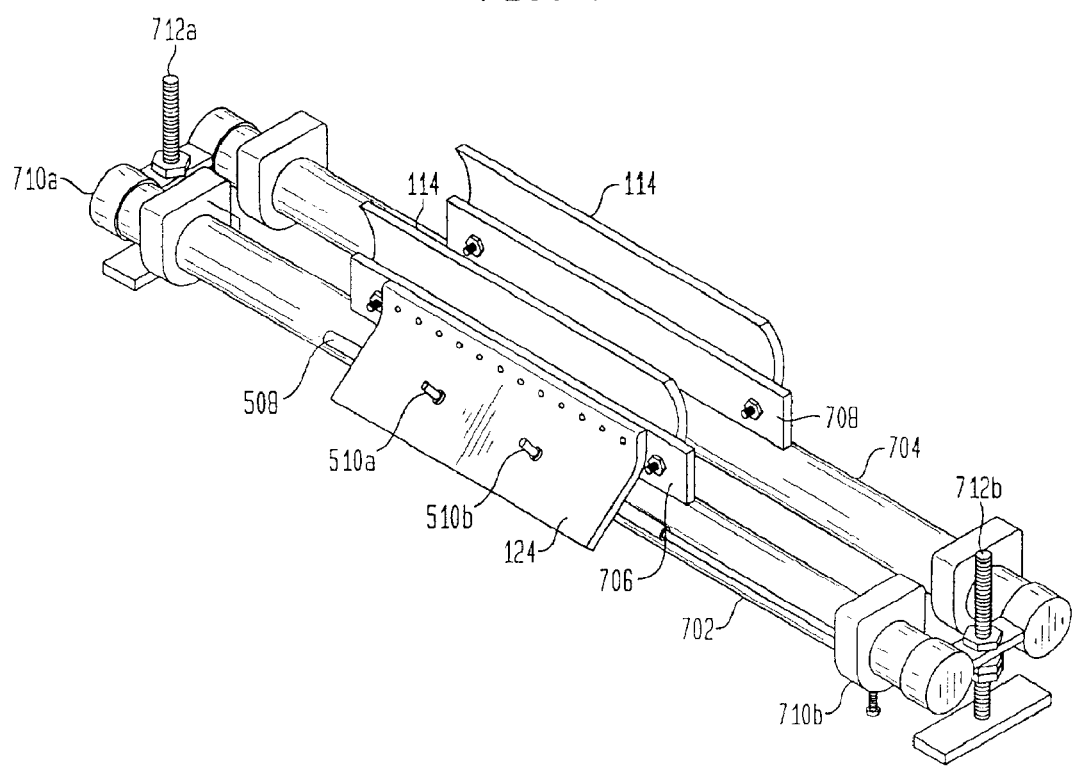
FIG. 7 is an alternative embodiment showing consecutive blade holder assemblies mounted sequentially in a series.
Figure 8:
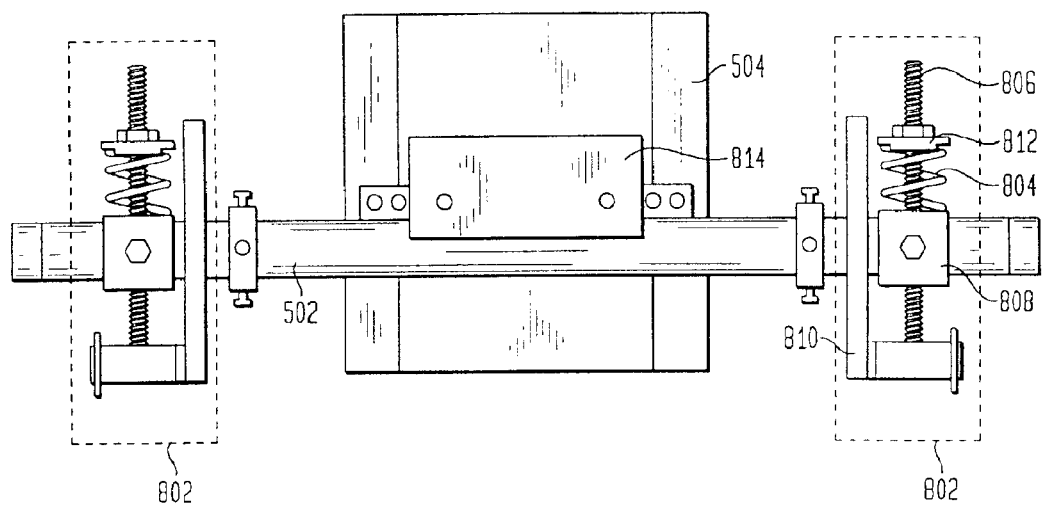
FIG. 8 is a planar side view showing a compression arm assembly.

FIGS. 1–4B show an exemplary embodiment of the torsion blade holder assembly 100 of the present invention, FIGS. 5A–D show an alternative embodiment adapted for use with a means for spraying a liquid on a conveyor belt either prior to or after scraping, and FIGS. 6–8 illustrate various alternative embodiments of the present invention. The torsion blade holder assembly 100 of the present invention comprises two sub-assemblies: a mounting sub-assembly and a blade support sub-assembly, wherein the blade support sub-assembly is connected to the mounting sub-assembly and the mounting sub-assembly secures the blade support assembly (and thereby secures the torsion blade holder assembly 100) to a shaft such that a surface of a conveyor belt travels over and in contact with a scraper blade 114 within the blade support sub-assembly as a means for cleaning the surface of the conveyor belt.

In the preferred embodiment, the mounting sub-assembly employs torsion means for allowing the mounting sub-assembly to rotate in relation to a shaft on which the mounting sub-assembly is removably attached. The preferred mounting sub-assembly includes a first hollow member 102, a second member 104, and a means for securing the first hollow member 102 to the shaft. The preferred means for securing is a base plate 136, welded to the bottom of the first hollow member 102, and having one or more holes 138. One or more conventional circular fasteners or clamps are used to bolt the base plate 136, via holes 138, to the shaft.

The torsion means of the mounting sub-assembly comprises the first hollow member 102 having an inside diameter greater than the outside diameter of the second member 104 thereby allowing at least a portion of the second member 104 to be inserted and situated inside the first hollow member 102. In a preferred embodiment, the second member 104 is slightly longer than the first hollow member 102 such that the second member 104 extends completely through and slightly beyond the first hollow member 102 on both sides.

Figure 1:
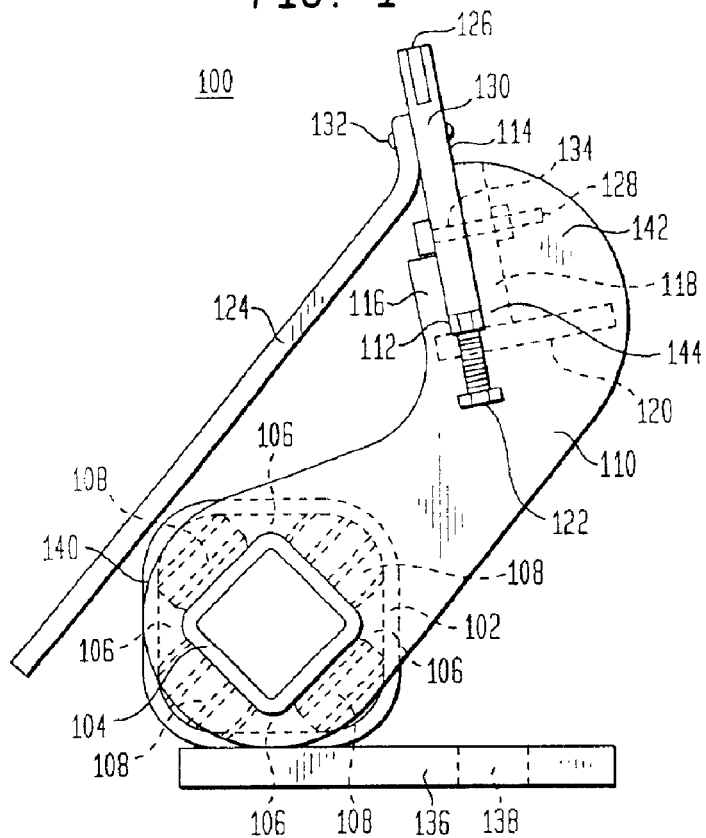
FIG. 1 is a planar side view of a torsion blade holder assembly including a scraper blade.

As shown in FIG. 1, both the first hollow member 102 and the second member 104 preferably have cross-sections that are about square. Due to the difference between the inside diameter of the first hollow member 102 and the second member 104, there exists a volume of space 106 between the first hollow member 102 and the second member 104. The volume of space 106 allows the second member 104 to rotate freely within the first hollow member 102. To restrict this free rotation of the second member 104, the second member 104 is off-set approximately 45 degrees from the first hollow member 102, and the volume of space 106 is filled with one or more torsion elements 108. The torsion elements 108 restrict the ability of the second member 104 to rotate within the first hollow member 102. In the present invention, the torsion elements 108 are preferably one or more rubber pieces, but this is for convenience purpose only.

In a preferred embodiment, the corners of the second member 104 are rounded slightly to increase the range of rotation of the second member 104 within the first hollow member 102. The torsion elements 108 are preferably made of a resilient material, such as, but not limited to rubber. When the torsion elements 108 are compressed, they allow restricted rotation of the second member 104 within the first hollow member 102, and then, due to their inherent resilient nature, the torsion elements 108 restore the second member 104 to its pre-compression relationship with the first hollow member 102.

The assembly of the first hollow member 102, second member 104, and plurality of torsion elements 108 are performed according to conventional means. Specifically, each of the torsion elements 108 are elongated bars of rubber having a circular cross-sectional shape, wherein the length of each torsion element 108 is equal to about the length of the first hollow member 102. Each torsion element 108 is compressed until its cross-sectional shape is generally triangular in shape, and then each reshaped torsion element 108 is frozen using conventional cryogenic methods and inserted into a separate cavity 106, also generally triangular in shape, between the second member 104 and the first hollow member 102. As the torsion elements 108 thaw within the cavities 106, each torsion element 108 conforms to the general shape of the specific cavity 106 in which that torsion element 108 is located. This method for assembling the first hollow member 102, second member 104, and torsion elements 108 provide a sturdier and more durable connection, and when coupled with the second member 104 having rounded corners, provides a connection having a greater arching range of motion of the second member 104 within the first hollow member 102.

A blade support sub-assembly of the torsion blade holder assembly 100 is fixedly secured to the ends 204a,b of the second member 104 of the mounting sub-assembly. Specifically, the blade support sub-assembly comprises a pair of notched receiving members 110, each having a first end 140 and a second end 142, a face plate 118, a horizontal blade stabilizer 120, a means for vertically adjusting a scraper blade 114 positioned within the second ends 142 of the notched receiving members 110, and a means for removably securing the scraper blade 114 within the second ends 142 of the notched receiving members 110. The first end 140 of each notched receiving member 110 is fixedly secured to an end, e.g., end 204a, of the second member 104 protruding beyond the outer edge of the first hollow member 102. Thus, whenever the second member 104 rotates within the first hollow member 102, the notched receiving members 110 both rotate. Alternatively, the mounting sub-assembly does not employ torsion means for rotating the blade support sub-assembly. For example, in another embodiment, the mounting sub-assembly may comprise simply bolting the blade support sub-assembly to a shaft 502.

At their second ends 142, each notched receiving member 110 has a notch 112 adapted for receiving a scraper blade 114. The scraper blade 114 preferably is rectangular in shape and has a tungsten carbide tip 126 permanently fixed and secured within a blade housing 130. Each notch 112 of a notched receiving member 110 is formed by a front vertical stabilizer 116 and a rear vertical stabilizer 144 being spaced apart by a pre-defined distance such that a width of a scraper blade 114 fits securely within the notches 112. Also, the rear vertical stabilizer is preferably taller in height that the front vertical stabilizer 116 for additional stability of the scraper blade 114 during the cleaning process.

The face plate 118 is a rectangular component having a length that is about the distance between the pair of notched receiving members 110 and that is positioned such that the front surface of the face plate 118 is aligned with the edges and height of the rear vertical stabilizers 144. As a result, when a scraper blade 114 is installed within the notches 112 of the notched receiving members 110, the scraper blade 114, or at least a portion of the scraper blade 114, rests flush against the front surface of the face plate 118. Therefore, the face plate 118 is about parallel to the scraper blade 114 and provides rear support for the scraper blade 114 during the cleaning process.

A horizontal blade stabilizer 120 also extends between the notched receiving members 110, however, the horizontal blade stabilizer 120 is in a plane about perpendicular to the plane in which the face plate 118 extends. The horizontal blade stabilizer 120 extends beneath the face plate 118 and the scraper blade 114, and stops at a point about even with the front edges of the notched receiving members 110.

In operation, the scraper blade 114 is inserted in the notches 112 between the front vertical blade stabilizers 116 and the rear vertical stabilizers 144 of the notched receiving members 110 such that the rear surface of the scraper blade 114 is in contact with the face plate 118 extending between the notched receiving members 110 and the bottom surface of the scraper blade 114 is above the horizontal blade stabilizer 120.

The scraper blade 114 is preferably secured to the face plate 118 by at least one screw or bolt 128 extending through one or more holes 134 in the scraper blade housing 130 and through one or more holes 202a,b in the face plate 118 that align with the holes 134 in the scraper blade housing 130. The use of one or more adjustable screws 128 is preferred because this allows for the quick and efficient removal and replacement of a scraper blade 114 within the torsion blade holder assembly 100.

Figure 2:
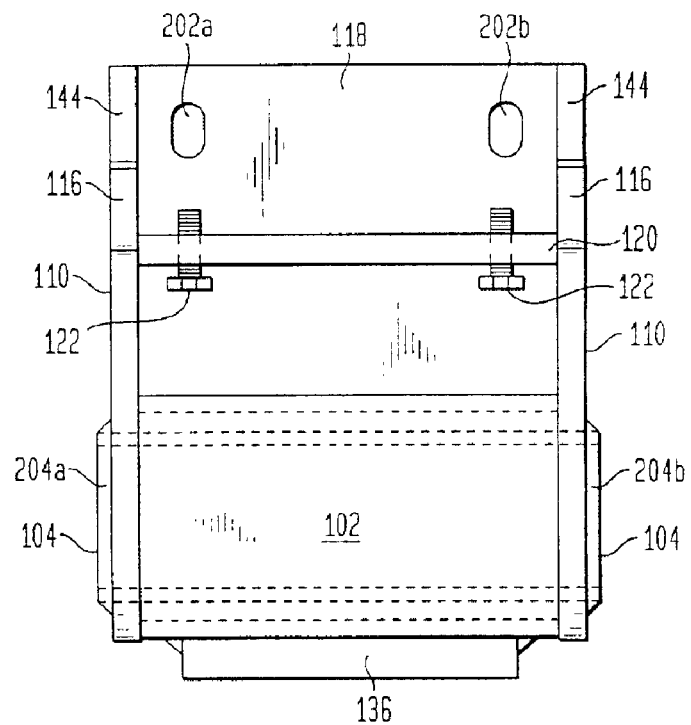
FIG. 2 is a planar front view of a torsion blade holder assembly.
Figure 3:
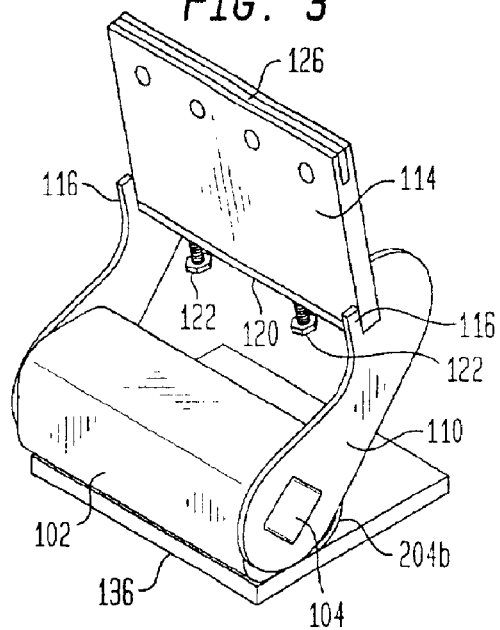
FIG. 3 a perspective front view of a torsion blade holder assembly including a scraper blade.

Extending up through the horizontal blade stabilizer 120 is at least one adjustable lock bolt 122. The top of the adjustable lock bolts 122 are in direct contact with the bottom surface of the scraper blade 114. As a result, the height of the scraper blade 114 can be easily adjusted by raising and lowering the adjustable lock bolts 122. Also, when the adjustable lock bolts 122 are located near the outer edges of the scraper blade 114, as shown in FIGS. 2–4, each side of the scraper blade 114 can be adjusted independently. The number and position of adjustable lock bolts 122 is for convenience purpose only. It would be readily apparent to one of ordinary skill in the relevant art to use a different number and/or position of adjustable lock bolts 122 with a scraper blade 114. In addition, the use of adjustable lock bolts 122 is also for convenience. It would be readily apparent to one of ordinary skill in the relevant art to use a comparable means for vertically adjusting different portions of the scraper blade 114, e.g., screws, pressure fit or adjustably locking clasps and fasteners.

Optionally, a shield 124 is removably attached to the scraper blade 114 to deflect debris away from the torsion blade holder assembly 100 as the debris is scraped away and removed from the surface of the conveyor belt 504. The shield 124 is removably secured to the blade housing 130 by one or more screws, rivots, or other fasteners passing through a hole in the shield 124 and a hole in the blade housing 130. Also, the shield 124 is preferably made from a thin, but durable, sheet of plastic having a length that extends over and covers the entire torsion blade holder assembly 100.

In operation, typically two or more torsion blade holder assemblies 100 are mounted, usually on a shaft 502, in the desired proximity of a conveyor belt 504. Coarse adjustments to the position of a scraper blade 506 in relation to the conveyor belt 504 are generally made by moving the entire shaft 502 both vertically and horizontally in relation to the surface of the conveyor belt 504 being cleaned. Fine adjustments are made to the position of the scraper blade 506 on individual torsion blade holder assemblies 100 by adjusting one or more adjustable lock bolts 122 under each scraper blade 114. An alternative scraper blade 506 is shown in FIG. 5D without a blade insert 126 for convenience only.

Once the torsion holder assemblies 100 are in the desired location, the conveyor belt 504 is turned on. The scraper blade 506 is in direct contact with the outer surface of the conveyor belt 504 with the amount of pressuring exerted on the conveyor belt 504 by the scraper blade 506 depending on the set-up. When seams or debris affixed to the conveyor belt 504 contact the scraper blade 506, the second member 104 rotates within the first hollow member 102 (assuming the debris or seam contacts the scraper blade 114 with sufficient force), thereby rotating the scraper blade 506 in an arc away from the conveyor belt 504. The resilient nature of the torsion elements 108 then restore the spatial relationship of the second member 104 to the first hollow member 102 resulting in the scraper blade 506 being returned to its proper position in contact with the surface of the conveyor belt 504.

One of many alternative embodiments of this invention includes a means for spraying a liquid on a conveyor belt 504 as the conveyor belt 504 passes over a torsion blade holder assembly 100. In particular, the means for spraying involves spraying a liquid, such as water or other liquid agent, onto a section of the conveyor belt 504 either prior to or immediately after scraping that area of the conveyor belt 504 with a scraper blade 114. As also shown in FIGS. 5A–C, a pipeline 508 for transporting a liquid is removably attached to the outer surface of the shaft 502 on which the torsion blade holder assemblies 100 are mounted using conventional clasps or other fasteners. The pipeline 508 is in communication with a source of the liquid, e.g., a storage container (not shown for convenience) and has one or more nozzles 510a,b positioned along the length of the pipeline 508 at a predefined distance from each other. Corresponding to the predefined distance between the nozzles 510a,b on the pipeline 508, one or more holes 514a,b are positioned on a shield 124 mounted on the scraper blades 506. The holes 514a,b in the shield 124 are of a diameter that corresponds to the diameter of the nozzles 510a,b such that the nozzles 510a,b of the pipeline 508 are inserted through the holes 514a,b in the shield 124. The pipeline 508 is preferably a heavy duty, ½ inch or ¾ inch, galvanized or stainless steel tubing and also has an on/off valve 512 which is used to restrict the flow of liquid from the liquid source through the pipeline 508. The means for spraying is described in these terms for convenience purpose only. It would be readily apparent to one of ordinary skill in the relevant art to relocate the pipeline 508, such as, to inside a cavity of a hollow shaft 502.

In operation, when the shield 124 is mounting on the front side of a scraper blade 114, as shown in FIG. 1, liquid is transported through the pipeline 508 and via the nozzles 510a,b is sprayed on the surface of the conveyor belt 504 just prior to the conveyor belt 504 reaching the scraper blade 114. The liquid in this use may be water, a cleaning agent, or solvent that helps to soften or remove debris from the conveyor belt 504. Therefore, the scraper blade 506 is more effective during the cleaning process while reducing the wear on the torsion blade holder assembly 100.

In operation, when the shield 124 is mounting on the rear side of a scraper blade 114, liquid is transported through the pipeline 508 and via the nozzles 510a,b is sprayed on the surface of the conveyor belt 504 just after the conveyor belt 504 is scraped clean by the scraper blade 114. The liquid in this use may be water, anti-freeze, dust inhibitor, or other treating agent that helps to treat the conveyor belt 504 for a special condition.

The present invention is described in terms of a single torsion blade holder assembly 100 for convenience purposes only. It would be readily apparent to have alternative configurations of such torsion blade holder assemblies 100. For example, in FIG. 6, an alternative configuration is shown having a plurality of torsion blade holder assemblies 100 mounted on a single shaft 502. Preferably, the plurality of torsion blade holder assemblies 100 are positioned along the length of the shaft 502 such that they are centered along a central axis 602 of the conveyor belt 504 in order to cover the entire width, or almost the entire width, of the conveyor belt 504.

In another alternative embodiment as shown on FIG. 7, two or more shafts, such as a first shaft 702 and a second shaft 704, may be mounted sequentially one behind the other wherein at least one torsion blade holder assembly 100 is mounted on each shaft 702, 704. As shown, the mounting sub-assembly 706 are fixed mounts that do not rotate a scraper blade 114 in relation to the shafts 702, 704. The plurality of shafts 702, 704 are joined together at their ends with a first shaft housing member 710a and a second shaft housing member 710b. Specifically, each end of a shaft 702, 704 is fit and secured with a shaft housing member 710. The first shaft housing member 710a is then mounted to a first adjustable support shaft 712a and the second shaft housing member 710b is then mounted to a first adjustable support shaft 712b. The two support shafts 712a,b are secured to a base or other support which places the torsion blade holder assemblies 100 in proper position in relation to a conveyor belt 504. Using this configuration, a conveyor belt 504 is cleaned by a series of torsion blade holder assemblies 100 thereby providing a more thorough scraping and cleaning of the conveyor belt 504.

In this configuration, many variations are possible. For example, only the first torsion blade holder assembly 100 may have a shield 124 and a means for spraying a liquid on the conveyor belt 504. Alternatively, the last torsion blade holder assembly 100 in the series may have the shield 124 and means for spraying a liquid on the conveyor belt 504. Also, one or more of the torsion blade holder assemblies 100 in the series may have a shield 124 and/or a means for spraying a liquid. Lastly, the mounting sub-assembly of each torsion blade holder assembly 100 may either employ a torsion means to allow for the rotation of the blade support sub-assembly, or may be a fix mount prohibiting such rotation.

In another alternative embodiment, a mounting sub-assembly includes a compression arm 802 to secure a shaft 502 during the cleaning process. In this embodiment, the mounting sub-assembly of a torsion blade holder assembly 100 does not employ torsion properties that allow a scraper blade 114 to rotate in relation to the mounting sub-assembly, but rather the preferred mounting in this embodiment is a urethane scraper blade 814 bolted to the shaft 502. The means for rotating the scraper blade 814 is handled by one or more compression arms 802 positioned at the end(s) of the shaft 502.

A compression arm 802 comprises a base plate 810 in communication with a pivoting spindle 806 having a threaded shaft and a pivoting component. A spring 804 is positioned on the threaded shaft of the pivoting spindle 806 and is held in place by a pair of spring buckets 812 (only one of which is visible in FIG. 8) and a thrust collar 808. This compression arm 802 employs a spring action such that when seams or debris affixed to the conveyor belt 504 contact the scraper blade 814, the compression arm 802 retracts (assuming the debris or seam contacts the scraper blade 814 with sufficient force), thereby rotating the shaft 502 and the scraper blade 814 away from the conveyor belt 504. The resilient nature of the spring 804 then restores the spatial relationship of the shaft 502 resulting in the scraper blade 814 being returned to its proper position in contact with the surface of the conveyor belt 504.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

What is claimed is:

1. A blade support sub-assembly adapted to be used with a scraper blade for scraping and cleaning a conveyor belt and with a mounting sub-assembly, comprising:

a pair of notched receiving members, each notched receiving member having a notch formed from a front vertical stabilizer and a rear vertical stabilizer, said notch for receiving a scraper blade, and said pair of notched receiving members adapted for use with a mounting sub-assembly;

a face plate extending between said pair of notched receiving members and about parallel to the scraper blade such that at least a portion of the scraper blade rests flush against said face plate when the scraper blade is situated in said pair of notched receiving members; and a means for vertically adjusting a height of the scraper blade in relation to a fixed position of said pair of notched receiving members and said face plate such that the scraper blade is rigidly fixed at a selected height and is in contact with a surface of the conveyor belt to be scraped.

2. The blade support sub-assembly according to claim 1, wherein said means for vertically adjusting a height of the scraper blade in relation to a fixed position of said pair of notched receiving members comprises a horizontal blade stabilizer approximately perpendicular to and extending beneath said face plate, and one or more adjustable lock bolts extending upward through said horizontal blade stabilizer and in communication with a bottom surface of the scraper blade, wherein rotating one said adjustable lock bolt in a first direction raises said adjustable lock bolt and the scraper blade, and rotating one said adjustable lock bolt in a second direction lowers said adjustable lock bolt and the scraper blade.

3. The blade support sub-assembly according to claim 1, further comprising a means for removably securing the scraper blade within said notches of said pair of notched receiving members.

4. The blade support sub-assembly according to claim 3, wherein said means for removably securing the scraper blade comprises one or more adjustable screws and said face plate having one or more holes that align with one or more holes in a scraper blade, wherein each of said adjustable screws is adapted to pass through one of the holes in the scraper blade and through one of said holes in said face plate, thereby securing the scraper blade to said face plate at a fixed position.

5. The blade support sub-assembly according to claim 1, further comprising a shield attached to the scraper blade, wherein said shield extends from the scraper blade and over the blade support sub-assembly.

6. The blade support sub-assembly according to claim 1, wherein said rear vertical stabilizer is taller in height than said front vertical stabilizer.

7. The blade support sub-assembly according to claim 1, further comprising a scraper blade having a blade insert fixed within a blade housing.

8. The blade support sub-assembly according to claim 1, further comprising a means for spraying a liquid on the conveyor belt.

9. The blade support sub-assembly according to claim 8, wherein said means for spraying a liquid comprises a pipeline, for transporting a liquid, having one or more nozzles, a means for restricting a flow of the liquid through said pipeline, and a means for securing said pipeline and said one or more nozzles in proximity to the blade support sub-assembly.

10. The blade support sub-assembly according to claim 1, wherein said face plate is positioned between said notched receiving members such that said face plate is at a height aligned with a height of said rear vertical stabilizer of each said notched receiving member.

11. The blade support sub-assembly according to claim 1, further comprising:

a shield attached to the scraper blade, wherein said shield extends from the scraper blade and over the blade support sub-assembly.

12. The blade support sub-assembly according to claim 1, wherein said mounting sub-assembly comprises a first hollow member being an elongated tube having an internal diameter, a second member being an elongated component having an external diameter less than said internal diameter of said first hollow member wherein said second member is inserted within said first hollow member thereby creating a space between said first hollow member and said second member, a means for restricting rotation of said second member within said first hollow member contained within said space, a means for securing said second member to said pair of notched receiving members such that as said second member rotates within said first hollow member said notched receiving members rotate, and a means for securing said first hollow member at a position below the conveyor belt such that the scraper blade is in contact with the conveyor belt.

13. The blade support sub-assembly according to claim 12, wherein said second member has a length longer than said first hollow member.

14. The blade support sub-assembly according to claim 12, wherein said first hollow member and said second member have a generally square cross-sectional shape.

15. The blade support sub-assembly according to claim 14, wherein said second member is offset approximately 45 degrees from said first hollow member when said second member is inserted within said first hollow member.

16. The blade support sub-assembly according to claim 15, wherein said second member has rounded corners.

17. The blade support sub-assembly according to claim 12, wherein said means for restricting rotation of said second member within said first hollow member contained within said space is one or more torsion elements in said space.

18. The blade support sub-assembly according to claim 17, wherein said one or more torsion elements are elongated bars of rubber having a length generally equal to a length of said first hollow member.

19. The blade support sub-assembly according to claim 18, wherein said torsion elements have a generally circular cross-sectional shape.

20. The blade support sub-assembly according to claim 13, wherein said means for securing said second member to said pair of notched receiving members comprises a first end of said second member protruding through a hole in one of said pair of notched receiving members and a second end of said second member protruding through a hole in a second of said pair of notched receiving members.

21. A blade support sub-assembly adapted to be used with a scraper blade for scraping and cleaning a conveyor belt and with a mounting sub-assembly, comprising:
 a pair of notched receiving members, each notched receiving member having a notch formed from a front vertical stabilizer and a rear vertical stabilizer, said notch for receiving a scraper blade, and said pair of notched receiving members adapted for use with a mounting sub-assembly;
 a face plate extending between said pair of notched receiving members and about parallel to the scraper blade such that at least a portion of the scraper blade rests flush against said face plate when the scraper blade is situated in said pair of notched receiving members;
 a means for vertically adjusting a height of the scraper blade in relation to a fixed position of said pair of notched receiving members such that the scraper blade is in contact with a surface of the conveyor belt to be scraped;
 a means for spraying a liquid on the conveyor belt, wherein the said means for spraying a liquid comprises a pipeline, for transporting a liquid, having one or more nozzles, a means for restricting a flow of the liquid through said pipeline, and a means for securing said pipeline and said one or more nozzles in proximity to the blade support sub-assembly; and
 a shield, having one or more holes, attached to the scraper blade, wherein said shield extends from the scraper blade and over the blade support sub-assembly, wherein each of said or more nozzles of said pipeline aligns with and extends through one of said one or more holes in said shield.

22. The blade support sub-assembly according to claim 21, wherein said shield is attached to a front of the scraper blade such that the liquid is sprayed toward the conveyor belt.

23. The blade support sub-assembly according to claim 21, wherein said shield is attached to a front of the scraper blade such that the liquid is sprayed toward the conveyor belt.

24. A blade support sub-assembly adapted to be used with a scraper blade for scraping and cleaning a conveyor belt and with a mounting sub-assembly, comprising:
 a pair of notched receiving members, each notched receiving member having a notch formed from a front vertical stabilizer and a rear vertical stabilizer, said notch for receiving a scraper blade, and said pair of notched receiving members adapted for use with a mounting sub-assembly;
 a face plate extending between said pair of notched receiving members and about parallel to the scraper blade such that at least a portion of the scraper blade rests flush against said face plate when the scraper blade is situated in said pair of notched receiving members;
 a means for vertically adjusting a height of the scaper blade in relation to a fixed position of said pair of notched receiving members such that the scraper blade is in contact with a surface of the conveyor belt to be scraped; and
 a means for spraying a liquid on the conveyor belt, wherein the liquid is selected from the group consisting of water, a cleaning agent, a solvent, anti-freeze, and a dust inhibitor.

25. A blade support sub-assembly adapted to be used with a scraper blade for scraping and cleaning a conveyor belt and with a mounting sub-assembly, comprising:
 a pair of notched receiving members, each notched receiving member having a notch formed from a front vertical stabilizer and a rear vertical stabilizer, said notch for receiving a scraper blade, and said pair of notched receiving members adapted for use with a mounting sub-assembly;
 a face plate extending between said pair of notched receiving members and about parallel to the scraper blade such that at least a portion of the scraper blade rests flush against said face plate when the scraper blade is situated in said pair of notched receiving members;
 a means for spraying a liquid on the conveyor belt, wherein said means for spraying a liquid comprises a pipeline, for transporting a liquid, having one or more nozzles, a means for restricting a flow of the liquid through said pipeline, and a means for securing said pipeline and said one or more nozzles in proximity to the blade support sub-assembly; and
 a shield, having one or more holes, attached to the scraper blade, wherein said shield extends from the scraper blade and over the blade support sub-assembly, wherein each of said one or more nozzles of said pipeline aligns with and extends through one of said one or more holes in said shield.

26. The blade support sub-assembly according to claim 25, wherein said shield is attached to a front of the scraper blade such that the liquid is sprayed toward the conveyor belt.

27. The blade support sub-assembly according to claim 25, wherein said shield is attached to a rear of the scraper blade such that the liquid is sprayed toward the conveyor belt.

28. A blade support sub-assembly adapted to be used with a scraper blade for scraping and cleaning a conveyor belt and with a mounting sub-assembly, comprising:

a pair of notched receiving members, each notched receiving member having a notch formed from a front vertical stabilizer and a rear vertical stabilizer, said notch for receiving a scraper blade, and said pair of notched receiving members adapted for use with a mounting sub-assembly;

a face plate extending between said pair of notched receiving members and about parallel to the scraper blade such that at least a portion of the scraper blade rests flush against said face plate when the scraper blade is situated in said pair of notched receiving members; and a means for spraying a liquid on the conveyor belt, wherein the liquid is selected from the group consisting of water, a cleaning agent, a solvent, anti-freeze, and a dust inhibitor.

29. The blade support sub-assembly according to claim 28, wherein said means for spraying a liquid comprises a pipeline, for transporting a liquid, having one or more nozzles, a means for restricting a flow of the liquid through said pipeline, and a means for securing said pipeline and said one or more nozzles in proximity to the blade support sub-assembly.

30. The blade support sub-assembly according to claim 28, wherein said mounting sub-assembly comprises a first hollow member being an elongated tube having an internal diameter, a second member being an elongated component having an external diameter less than said internal diameter of said first hollow member wherein said second member is inserted within said first hollow member thereby creating a space between said first hollow member and said second member, a means for restricting rotation of said second member within said first hollow member contained within said space, a means for securing said second member to said pair of notched receiving members such that as said second member rotates within said first hollow member said notched receiving members rotate, and a means for securing said first hollow member at a position below the conveyor belt such that the scraper blade is in contact with the conveyor belt.

31. The blade support sub-assembly according to claim 30, wherein said second member has a length longer than said first hollow member.

32. The blade support sub-assembly according to claim 30, wherein said first hollow member and said second member have a generally square cross-sectional shape.

33. The blade support sub-assembly according to claim 32, wherein said second member is offset approximately 45 degrees from said first hollow member when said second member is inserted within said first hollow member.

34. The blade support sub-assembly according to claim 33, wherein said second member has rounded corners.

35. The blade support sub-assembly according to claim 30, wherein said means for restricting rotation of said second member within said first hollow member contained within said space is one or more torsion elements in said space.

36. The blade support sub-assembly according to claim 35, wherein said one or more torsion elements are elongated bars of rubber having a length generally equal to a length of said first hollow member.

37. The blade support sub-assembly according to claim 36, wherein said torsion elements have a generally circular cross-sectional shape.

38. The blade support sub-assembly according to claim 31, wherein said means for securing said second member to said pair of notched receiving members comprises a first end of said second member protruding through a hole in one of said pair of notched receiving members and a second end of said second member protruding through a hole in a second of said pair of notched receiving members.

* * * * *